Patented Apr. 6, 1937

2,076,217

UNITED STATES PATENT OFFICE 2,076,217

CARBOXYLIC ACID AMIDES OF SULPHONATED AROMATIC CARBOXYLIC ACIDS AND PROCESS OF MAKING SAME

Otto Albrecht, Basel, Switzerland, assignor to the firm of Society of Chemical Industry in Basle, Basel, Switzerland No Drawing. Application April 20, 1936, Serial No. 75,494. In Switzerland April 27, 1935

18 Claims. (Cl. 260—124)

The present invention relates to the manufacture of new carboxylic acid amides of sulphonated aromatic carboxylic acids. It comprises the process of making these new amides and the new amides themselves.

According to this invention new carboxylic acid amides valuable as auxiliaries in the textile industry are made by the reaction of a sulphonic acid or a sulphonate of an aromatic carboxylic acid of the benzene and naphthalene series, or a substitution product thereof, or an ester, anhydride or halide of these compounds, containing at least one sulphonic acid group in a meta-position to a carboxylic group, with amines which contain more than two carbon atoms and at least one free hydrogen atom bound to the nitrogen atom.

The process may consist in heating the free sulphonic acid or a salt thereof with the amine, if desired in the presence of a solvent, for instance pyridine, quinoline, dimethyl-para-toluidine or the like. The carboxylic acid anhydride or chloride reacts with the primary or secondary amine particularly easily. The carboxylic acid chloride may be produced during the reaction, for example with the aid of phosphorous trichloride. Carboxylic acid esters of aromatic sulfocarboxylic acid may be converted into amides by heating them with primary or secondary amines. Amides and imides may be made from the sulphonic acids or aromatic ortho-dicarboxylic acids or their derivatives.

As parent materials may be named sulphonic acids of aromatic mono- and dicarboxylic acids, their anhydrides, halides or esters containing at least one sulphonic acid group in a meta-position to a carboxylic group, for example meta-sulphobenzoic acids, sulphotoluylic acids, sulphochlorobenzoic acids, sulphosalicylic acid, sulphonic acids of phthalic acid, isophthalic acid, napthalic acid or of their anhydrides; phthalic acid-disulphonic acids; sulpho-terephthalic acids; sulpho-4-chlorophthalic acid.

Amines suitable for the reaction are primary and secondary, saturated or unsaturated aliphatic, cyclo-aliphatic, aromatic, aliphatic-aromatic or heterocyclic amines with branched or preferably straight chain, as well as their derivatives, provided the latter contain at least one free hydrogen atom attached to the nitrogen, for example, propyl, butyl, amyl, octyl, decyl, dodecyl, hexadecyl, octadecyl, cetylmethyl amines; amino-ethyl-dimethylamine; mono-stearylethylene-diamine; diethanolamine; lauric acid-ethanolamine ester; cyclo-hexylamine; hexahydrotoluidine, aniline; aminophenol; chloraniline, benzidine, benzylamine, piperidine; para-aminolauric acid-anilide, para-aminostearic acid-anilide or the like. Dodecyl-amine, hexadecylamine, mono-stearoylethylene diamine, para-amino-lauric anilide and para-aminostearic anilide are examples of amines containing an aliphatic carbon chain of at least eight carbon atoms and at least one free hydrogen atom bound to the nitrogen atom.

The carboxylic acid amides prepared according to the present invention constitute, in the form of their dried alkali salts, powders which easily dissolve in water and which, when heated with suitable saponifying agents, such as sodium hydroxide solution, are split up into an aromatic sulphocarboxylic acid and amines containing more than two carbon atoms. They are useful owing to their capillary activity as textile assistants, for example as agents for wetting, cleaning, washing, dispersing and equalizing. They are also suitable for softening the fiber and increasing the wetting capacity of mercerizing liquors. They may be used alone or inconjunction with other substances, for instance solvents, salts of mono- or polyvalent metals, soaps or substances resembling soap, as well as protective colloids.

The following examples illustrate the invention, the parts being by weight:—

Example 1

8.5 parts of sulphophthalic acid-anhydride are dissolved with aid of heat in 10 parts of pyridine and there is added a solution of 8.5 parts of methyl cetylamine in 10 parts of pyridine and the whole is heated on the boiling water-bath until a sample of the mass dissolves clearly in dilute caustic soda solution which happens in a short time. The mass is then allowed to cool, neutralized with sodium hydroxide solution and evaporated to dryness, preferably under diminished pressure. There is obtained a powder which is dissolved by water to a clear solution which foams strongly when shaken. It very probably corresponds with one of the following formulae:—

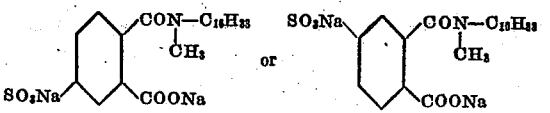

The methylcetylamine used may be made by heating cetylchloride with an alcoholic solution of methylamine in a closed vessel at 150–160° C.

For washing yolk from wool there may be used a solution of this product containing 1 gram per liter in the course of half-an-hour at 45° C. The wool thus washed becomes pure white.

Example 2

22.8 parts of sulphophthalic acid-anhydride and 17 parts of amylamine are together heated gradually to 190–200° C. and the mixture is kept at this temperature for about 12 hours. After cooling, the mass is diluted with water and is neutralized with sodium hydroxide solution; the volatile portion is then distilled by steam and the residual solution is evaporated to dryness whereby a pulverulent residue is obtained. It probably corresponds with the following formula, the correctness of which, however, has not yet been ascertained:—

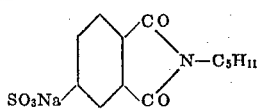

For mercerizing dried crude yarn there is used a mercerizing liquor (sodium hydroxide solution of 23.5 per cent) to which 0.5 per cent of the above assistant has been added. Thereupon the mercerization process proceeds very rapidly.

*Example 3*

5 parts of sulphophthalic acid-anhydride are dissolved with the aid of heat in 25 parts of pyridine. 5 parts of para-amino-lauric acid-anilide are added and the mixture is heated in a boiling water-bath until a sample of it dissolves clearly in hot water, which happens in a short time. The whole is neutralized with sodium hydroxide solution and evaporated to dryness. There is obtained a powder, the aqueous solution of which foams strongly when shaken and may be used in manner similar to that described in Example 1, for washing yolk from wool. It very probably corresponds with one of the following formulae:—

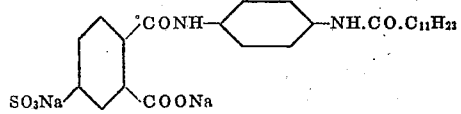

or

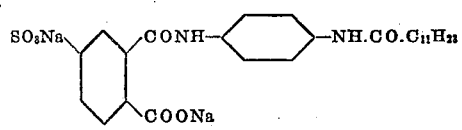

*Example 4*

5 parts of sulphophthalic acid-anhydride are dissolved with aid of heat in 20 parts of pyridine and 5 parts of para-amino-stearic acid-anilide and the whole is heated for about 1 hour in the boiling water-bath. After cooling the mass is neutralized in sodium hydroxide solution and evaporated to dryness, preferably under diminished pressure. There is obtained a powder, the aqueous solution of which foams strongly when shaken and which may be used for softening artificial silk. It very probably corresponds with one of the following formulae:—

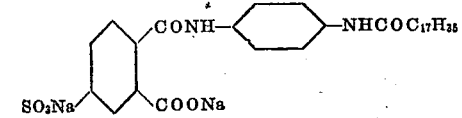

or

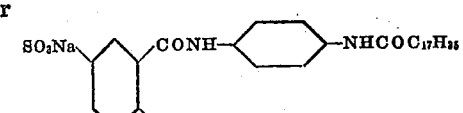
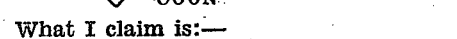

What I claim is:—

1. A process for the manufacture of carboxylic acid amides of aromatic sulphocarboxylic acids of the benzene series by reaction of a member selected from the group of compounds consisting of the aromatic sulphocarboxylic acids of the benzene series, their esters, anhydrides and halides, which contains at least one sulphonic acid group in a meta-position to a carboxylic group, with amines containing more than two carbon atoms and at least one free hydrogen atom bound to the nitrogen atom.

2. A process for the manufacture of carboxylic acid amides of aromatic sulphodicarboxylic acids of the benzene series by reaction of an aromatic sulphodicarboxylic acid anhydride of the benzene series, which contains at least one sulphonic acid group in a meta-position to a carboxylic group, with amines containing more than two carbon atoms and at least one free hydrogen atom bound to the nitrogen atom.

3. A process for the manufacture of carboxylic acid amides of aromatic sulphodicarboxylic acids of the benzene series by reaction of an aromatic sulpho-ortho-dicarboxylic acid anhydride of the benzene series, which contains at least one sulphonic acid group in a meta-position to a carboxylic group, with amines containing more than two carbon atoms and at least one free hydrogen atom bound to the nitrogen atom.

4. A process for the manufacture of carboxylic acid amides of aromatic sulphodicarboxylic acids of the benzene series by reaction of the 4-sulphophthalic acid anhydride with amines containing more than two carbon atoms and at least one free hydrogen atom bound to the nitrogen atom.

5. A process for the manufacture of carboxylic acid amides of aromatic sulphodicarboxylic acids of the benzene series by reaction of the 4-sulphophthalic acid anhydride with amines containing an aliphatic carbon chain of at least eight carbon atoms and at least one free hydrogen atom bound to the nitrogen atom.

6. A process for the manufacture of carboxylic acid amides of aromatic sulphodicarboxylic acids of the benzene series by reaction of the 4-sulphophthalic acid anhydride with para-amino-lauric acid anilide.

7. A process for the manufacture of carboxylic acid amides of aromatic sulphodicarboxylic acids of the benzene series by reaction of the 4-sulphophthalic acid anhydride with para-amino-stearic acid anilide.

8. A process for the manufacture of carboxylic acid amides of aromatic sulphodicarboxylic acids of the benzene series by reaction of the 4-sulphophthalic acid anhydride with aliphatic amines containing at least eight carbon atoms and at least one free hydrogen atom bound to the nitrogen atom.

9. A process for the manufacture of carboxylic acid amides of aromatic sulphodicarboxylic acids of the benzene series by reaction of the 4-sulphophthalic acid anhydride with methyl cetyl amine.

10. The carboxylic acid amides of aromatic sulphocarboxylic acids of the benzene series which contain at least one sulphonic acid group in a meta-position to a carboxylic group with amines containing more than two carbon atoms, which products, in the form of their dried alkali salts, constitute powders which easily dissolve in water, and which, when heated with hydrochloric acid, are split up into an aromatic sulphocarboxylic acid of the benzene series and hydrochlorides of amines containing more than two carbon atoms.

11. The carboxylic acid amides of aromatic sulphodicarboxylic acids of the benzene series which contain at least one sulphonic acid group in a meta-position to a carboxylic group with amines containing more than two carbon atoms, which products, in the form of their dried alkali salts, constitute powders which easily dissolve in water, and which, when heated with hydrochloric acid, are split up into an aromatic sulphodicarboxylic acid of the benzene series and hydrochlorides of amines containing more than two carbon atoms.

12. The carboxylic acid amides of aromatic sulpho-ortho-dicarboxylic acids of the benzene series which contain at least one sulphonic acid group in a meta-position to a carboxylic group with amines containing more than two carbon atoms, which products, in the form of their dried alkali salts, constitute powders which easily dissolve in water, and which, when heated with hydrochloric acid, are split up into an aromatic sulpho-ortho-dicarboxylic acid of the benzene series and hydrochlorides of amines containing more than two carbon atoms.

13. The carboxylic acid amides of the 4-sulphophthalic acid with amines containing more than two carbon atoms, which products, in the form of their dried alkali salts, constitute powders which easily dissolve in water, and which, when heated with hydrochloric acid, are split up into the 4-sulphophthalic acid and hydrochlorides of amines containing more than two carbon atoms.

14. The carboxylic acid amides of the 4-sulphophthalic acid with amines containing an aliphatic carbon chain of at least eight carbon atoms, which products, in the form of their dried alkali salts, constitute powders which easily dissolve in water, and which, when heated with hydrochloric acid, are split up into the 4-sulphophthalic acid and hydrochlorides of amines containing an aliphatic carbon chain of at least eight carbon atoms.

15. The carboxylic acid amides of the 4-sulphophthalic acid with para-amino-lauric acid anilide, which products, in the form of the their dried alkali salts, constitute powders which easily dissolve in water, and which, when heated with hydrochloric acid, are split up into the 4-sulphophthalic acid and the hydrochloride of para-amino-lauric acid anilide.

16. The carboxylic acid amides of the 4-sulphophthalic acid with para-amino-stearic acid anilide, which products, in the form af their dried alkali salts, constitute powders which easily dissolve in water, and which, when heated with hydrochloric acid, are split up into the 4-sulphophthalic acid and the hydrochloride of para-amino-stearic acid anilide.

17. The carboxylic acid amides of the 4-sulphophthalic acid with aliphatic amines containing at least eight carbon atoms, which products, in the form of their dried alkali salts, constitute powders which easily dissolve in water, and which, when heated with hydrochloric acid, are split up into the 4-sulphophthalic acid and hydrochlorides of aliphatic amines containing at least eight carbon atoms.

18. The carboxylic acid amides of the 4-sulphophthalic acid with methyl-cetyl amine, which products, in the form of their dried alkali salts, constitute powders which easily dissolve in water, and which, when heated with hydrochloric acid, are split up into the 4-sulphophthalic acid and the hydrochloride of methyl-cetyl amine.

OTTO ALBRECHT.